Aug. 30, 1949.   T. H. CLARK   2,480,118
DIRECTION FINDER
Filed Dec. 19, 1946

INVENTOR.
TREVOR H. CLARK
BY
RP Morris
ATTORNEY

Patented Aug. 30, 1949

2,480,118

UNITED STATES PATENT OFFICE 2,480,118

DIRECTION FINDER

Trevor H. Clark, Boonton, N. J., assignor to Federal Telephone and Radio Corporation, New York, N. Y., a corporation of Delaware Application December 19, 1946, Serial No. 717,306

8 Claims. (Cl. 343—117)

This invention relates to radio direction finders, and more particularly to an automatic bearing-seeking indicator.

Briefly, the invention refers to a direction finder in which a radio-goniometer associated with an antenna system is caused to seek a null bearing position, and simultaneously describes the position of the null on the screen of a cathode ray tube, indicating the quality as well as the direction of the signal. The radio goniometer comprises stator and rotor windings coupled to the antenna system and the receiver, respectively. The output of the receiver is fed to a differential circuit and is used to control a motor for orienting the rotor with respect to the stator fields in such a manner that the rotor is caused to seek a null position. A source of low radio frequency is coupled to the rotor for providing an instantaneous indication of the rotor position. The low frequency energy is coupled to the stators of the goniometer across which are located the deflection means of a cathode ray oscilloscope. Band elimination filters are provided for preventing the low frequency energy from entering the receiver or antenna system. The circuits associated with the deflection means are established in such a way that a straight line will be caused to appear on the cathode ray screen, extending from the center radially towards the azimuth scale surrounding the screen. This line indicates sense as well as bearing since the injection of the low frequency causes only one-half of the line to appear.

One of the objects of this invention is to provide an automatic null-seeking direction finder, comprising an indicator for showing the quality as well as the direction of arrival of the signal being measured.

Another object of this invention is to provide novel apparatus which may be employed in conjunction with direction finders for indicating directions at remote points.

Another object of this invention is to provide apparatus employing low frequency energy for operating a radio direction finder indicator from the same goniometer that receives the radio direction signals.

Another object of this invention is to provide apparatus employing low frequency energy to operate the indicator of an automatic null-seeking direction finder over the same goniometer that receives the radio directional signals.

While my invention itself is defined in the appended claims, the invention, together with other and further objects and features thereof, will be best understood from the following description of an embodiment thereof, reference being had to the drawings in which:

Figure 1:
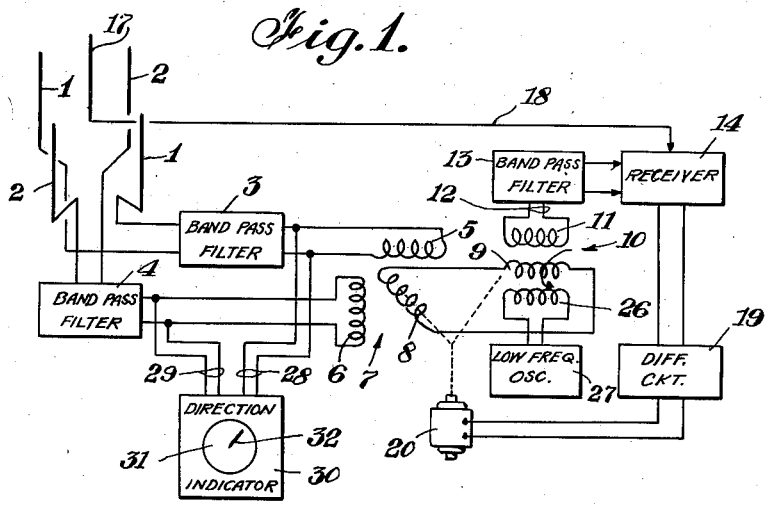
Figure 1 shows a block and schematic circuit of an automatic null-seeking direction finder employing the features of my invention.

Figure 1 shows two directional antennas 1 and 2 connected through band pass filters 3 and 4 to the stator windings 5 and 6 of a radio goniometer 7. The rotating coil 8 of the goniometer 7 is coupled to a rotating coil 9 of a rotating transformer 10. The stator coil 11 of rotating transformer 10 is coupled by means of leads 12 to band pass filter 13 which is similar to filters 3 and 4, and thence to a radio receiver 14 which receives the signals from antennas 1 and 2. The energy received by antennas 1 and 2 produces a resultant magnetic field in stators 5 and 6, respectively, which is indicative of the direction of the received signal. Rotor 8 is caused to rotate, by means to be explained later, so that it will be maintained perpendicular to the resultant field of stators 5 and 6. If the coil 8 is not perpendicular to this resultant field, energy from the resultant field of coils 5 and 6 is introduced into coil 8, and thence is passed through coils 9, 11, and filter 13 to receiver 14.

Figure 2:
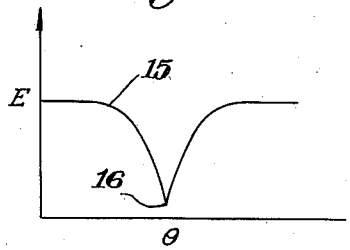
Figure 2 is a diagram showing a dynamic characteristic used in the automatic motor control circuit of Figure 1.

If $\theta$ is the angle through which the rotor 8 is turned, plotting this angle against the energy, E, passed to receiver 14 produces curve 15, as shown in Figure 2. In order that this curve have only one node 16 for each 360° rotation, a sense antenna 17 is connected through line 18 to the receiver 14 whereby the substantially cardoid-shaped response pattern 15 is produced. The energy from receiver 14 is then coupled through a differential circuit 19 to motor 20 which is mechanically coupled to rotors 8 and 9, as shown in Figure 1. Thus coupling between the rotor 8 and receiver 14 is provided without the use of sliding mechanical contacts, although other means could be used.

Figure 3:
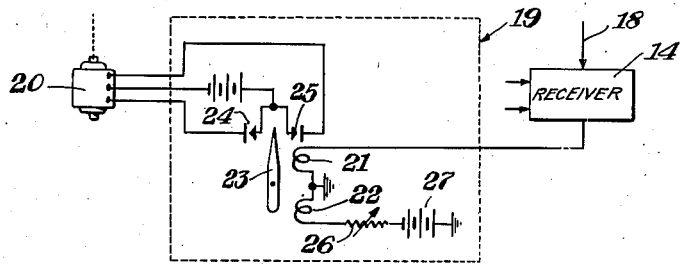
Figure 3 shows a schematic wiring diagram motor control circuit connected to a receiver.

One embodiment of a differential circuit 19 is shown in Figure 3 and comprises two induction coils, 21 and 22, which are inductively coupled to a pivoted armature 23 to operate either the counter-clockwise contact 24 or the clockwise contact 25 of the motor 20. When the current in both coils 21 and 22 is the same, the position of the armature 23 is as shown in Figure 3 with the motor 20 at rest. The current in 22 is determined by adjustment of rheostat 26 and the value of battery 27 to correspond to a null level at which the currents in coils 21 and 22 are matched for no further rotation of the motor 20.

It must be mentioned that the invention is not limited to the specific differential circuit shown in Figure 3, and that it may apply to other types of circuits employed to operate goniometer drives in determining directions.

Thus, it is seen that when the rotor 8 is not perpendicular to the resultant field of the stator windings of goniometer 7, energy will be passed through the receiver 14 and cause motor 20 automatically to rotate the rotor 8 until it is perpendicular to the goniometer resultant field, which corresponds to the node of the signal the direction of which is to be determined.

To provide a visual indication of the direction, a stationary coil 26, coupled to a low frequency oscillator 27, is coupled to coils 9 and 11. This low frequency energy is prevented from passing on to receiver 14 and antennas 1 and 2 by the band pass filters 3, 4, and 13. This low frequency energy, however, is transmitted from coil 8 to coils 5 and 6, and thence through lines 28 and 29 to a suitable direction indicator 30 which may comprise a cathode ray oscillograph 31 for producing a sense directional line 32 thereon. The resultant deflection in cathode ray indicator 31 depends on the relative magnitude of energy induced in coils 5 and 6 from source 27. These strengths in turn are determined by the angular position of rotor 8 with respect to the stator coils. It should be clear that means is provided, such as filters or the like, to prevent the radio frequency energy from antennas 1 and 2 from affecting the directional indications.

If the coil 8 is not located in a null position determined by the resultant magnetic fields produced in 5 and 6 by incoming signals, energy from antennas 1 and 2 will pass through the radio goniometer 7 to receiver 14 and cause the differential circuit to operate the motor, either in one direction or the other, so that the coil will be aligned to the null position.

While I have described above the principles of my invention in connection with specific apparatus, it is to be clearly understood that this description is made only by way of example and not as a limitation on the scope of my invention.

I claim:

1. A direction-finder comprising an antenna system, a radio goniometer comprising rotor and stator coupling means, means for coupling the output of said antenna system to said stator, means for adjusting said rotor to direction indicating positions, a low frequency signal source, means for coupling the low frequency signals to said rotor, a direction indicator, means for coupling the low frequency signals received by said stators to said indicating means.

2. A direction-finder comprising a directive antenna system, a radio goniometer comprising rotor and stator coupling means, means for coupling the output of said antenna system to said stators, means for adjusting said rotor to direction indicating positions, a low frequency signal source, means for coupling the low frequency signals to said rotor, a direction indicator, means for coupling the low frequency signals received by said stator to said indicating means, means for preventing the low frequency signals from passing on to said antenna system comprising band pass or band elimination filters.

3. A direction-finder comprising an antenna system, a radio goniometer comprising stator and rotor elements electrically coupled, means for coupling said stator elements to said antenna system, a receiver, means for coupling the output of said rotor to said receiver, a sense antenna, means for coupling said sense antenna to said receiver, driving means for rotating said rotor, means for coupling the output of said receiver to said driving means, a low frequency signal source, means for coupling said low frequency signals to said rotor, indicator means, means for coupling the low frequency signals received by said stators from said rotor to said indicating means.

4. A direction-finder comprising an antenna system, a radio goniometer, comprising stator and rotor windings, means for coupling said stator windings to said antenna system, a receiver, means for coupling the output of said rotor to said receiver, a sense antenna, means for coupling said sense antenna to said receiver, driving means for rotating said rotor, means for coupling the output of said receiver to said driving means, a low frequency signal source, means for coupling said low frequency signals to said rotor, indicator means, means for coupling the low frequency signals received by said stators from said rotor to said indicating means, means for preventing the low frequency signals from passing on to said receiver and said antenna system comprising band pass filters.

5. A direction-finder system comprising two sets of directional antennas, a goniometer comprising a rotor and quadrature spaced stator windings, means for coupling each one of said directional sets of antennas to separate stator windings, a rotating transformer comprising a primary winding, and a first and second secondary winding, means for coupling said goniometer rotor to the primary winding of said rotating transformer, a receiver, means for coupling the output of said first rotating transformer secondary to the input of said receiver, a sense antenna, means for applying the output of said first secondary winding and said sense antenna to the input of said receiver, driving means mechanically coupled to said goniometer rotor and said primary of said rotating transformer, a driving means control circuit, means for coupling the output of said receiver to the input of said driving means comprising said motor control circuit, a source of low frequency signals, means for applying said low frequency signals to the second secondary winding of said rotating transformer, indicator means, means for applying said low frequency signals received by said stators from said rotor to said indicator means.

6. A direction-finder system comprising two sets of antennas, a goniometer comprising a rotor and two quadrature spaced stator windings, means for coupling each one of said sets of antennas to separate stator windings comprising band pass filters, a rotating transformer comprising a primary winding, and a first and second secondary winding, means for coupling said goniometer rotor to the primary winding of said rotating transformer, a receiver, means for coupling the output of said first rotating transformer secondary to the input of said receiver comprising a band pass filter, a sense antenna, means for applying the output of said first secondary winding and said sense antenna to the input of said receiver, means for adjusting said rotor to direction indication positions, a source of low frequency signals, means for applying said low frequency signals to the second secondary winding of said rotating transformer, separate output leads connected between each of said band pass filters and said associated stators, a direction indicator comprising an oscilloscope having first and second deflection means, means for applying said low frequency signals to each of said deflection means comprising separate ones of said output leads connected to each of said deflections means.

7. A direction-finder system comprising two sets of directional antennas, a goniometer comprising a rotor and two quadrature spaced stator windings, means for coupling each one of said sets of antennas to separate stator windings comprising band pass filters, a rotating transformer comprising a primary winding, and a first and second secondary winding, means for coupling said goniometer rotor to the primary winding of said rotating transformer, a receiver, means for coupling the output of said first rotating transformer secondary to the input of said receiver comprising a band pass filter, a sense antenna, means for applying the output of said first secondary winding and said sense antenna to the input of said receiver, a differentiating circuit, driving means mechanically coupled to said goniometer rotor and said primary winding of said rotating transformer, means for coupling the output of said receiver to the input of said driving means comprising said differentiating circuit, a source of low frequency signals, means for applying said low frequency signals to the second secondary winding of said rotating transformer, separate output leads connected between each of said band pass filters and said associated stators, a direction indicator comprising an oscilloscope having first and second deflection means, means for applying said low frequency signals to each of said deflection means comprising separate ones of said output leads connected to each of said deflection means.

8. A radiant energy signal direction finder comprising a directive antenna system, means for producing a resultant electrical field descriptive of the direction of the signals received by said antenna system comprising electrical field coupling means coupled to said antenna system, a low frequency signal source, means for varying the resultant electrical field with the signals from said load frequency signal source, a direction indicator, means for extracting the low frequency signals from said varied resultant electrical field comprising said electrical field coupling means, and means for applying said extracted low frequency signals to said indicating means.

TREVOR H. CLARK.

REFERENCES CITED

The following references are of record in the file of this patent:

UNITED STATES PATENTS

| Number | Name | Date |
|---|---|---|
| 2,138,966 | Hafner | Dec. 6, 1938 |